3,028,218
Patented Apr. 3, 1962

3,028,218
METHOD FOR FACILITATING THE EXTRACTION OF ALUMINUM FROM ALUMINUM CONTAINING MATERIALS
Ferdinand Gregoire, Limonest, and Raymond Ricard, Lyon, France, assignors to Societe des Blancs de Zinc de la Mediterranee Eug. Chabaury, Pierre Gindre & Cie, Marseilles (Bouche-du-Rhone), France, a company of France
No Drawing. Filed July 30, 1957, Ser. No. 675,031
Claims priority, application France Aug. 27, 1956
5 Claims. (Cl. 23—141)

There exist for industrial purposes a number of products which have large contents of alumina and contain furthermore valuable components the extraction of which is of considerable interest.

Among these, may be mentioned the so-called red sludge which forms the residual matter obtained in the production of aluminium through the conventional methods and the composition of which is the following as an average:

| | Percent |
|---|---|
| Alumina | 25 to 30 |
| Iron oxides | 25 to 35 |
| Lime | 10 to 15 |
| Silica | 5 to 10 |
| Titanium oxide | 3 to 6 |

Similarly, it is possible to mention the residual matter obtained in the manufacture of ferro-titanium, starting from rutile or ilmenite and which contains generally the following components:

| | Percent |
|---|---|
| Alumina | 25 to 30 |
| Titanium oxide | 10 to 25 |
| Iron oxides | 10 to 15 |

The treatment of such residual matter is difficult, so that it is not generally used, since the conventional alkaline smelting treatments are expensive and lead often only to an incomplete and difficult recovery of the components.

The method according to the present invention allows actually obtaining in an economical manner and on an industrial scale this recovery through an easy separation of the valuable products contained in such residual matter and through a transformation thereof into pure products which may be readily used or into concentrates which are easily treated.

The improved method to be disclosed consists chiefly in the succession of the following steps each of which is known per se, but the application and combination of which have never been performed hitherto for the particular case constituted by the treatment of said residual matter:

(a) First stage: an alkaline sintering.

This operation is provided at a raised temperature in the presence of carbonate of soda with a view to removing the alumina and the metals the oxides of which are soluble in alkaline substances such as chromium, vanadium and manganese.

The amount of sodium carbonate varies according to the aluminium contents of the raw material which is being treated and the temperature is raised up to 800/850° C. for a duration of only 10 to 30 minutes. It is preferable to add borax for accelerating the reaction in amounts equal to about 1 to 2% by weight with reference to the weight of alumina.

This sintering allows removing 95% of the alumina existing in the raw material considered and this remarkable result is obtained with an expenditure of heat which is comparatively small since:

The temperature of sintering is not very high.
The duration of reaction is very short.

This constitutes novel conditions which correspond to the particular nature of the raw material which is being treated and these conditions are of considerable interest when proceeding on an industrial scale.

Of course, as disclosed hereinafter, the carbonate of soda used in said sintering is recovered and the extent of this recovery may reach easily 90%.

(b) Second stage: washing at raised temperature.

This operation provides two separate products, to wit:

An insoluble residuum containing the iron in the form of iron oxides, titanium, the alkaline earth oxides, magnesia, silica, etc.

An alkaline solution which contains together with the excess carbonate of soda, salts such as aluminates, chromates, vanadates, manganates, etc.

(c) Third stage: a reducing smelting of the residuum obtained in the second stage.

This third stage may be executed inside an electric furnace through different methods and in particular it is of advantage to resort to the method described in the French Patent 1,125,534, filed on April 18, 1954.

One obtains thus:

On the one hand, a cast iron having an excellent commercial grade.

On the other hand, a slag practically devoid of iron.

Said slag contains according to the raw material, various interesting components, chiefly titanium oxide the extraction of which may be obtained through conventional methods such in particular as the treating methods disclosed in the French Patents 1,108,062, filed on July 1, 1954, and 1,109,087, filed on July 2, 1954, said methods being of particular advantage in the present case.

(d) Fourth stage: treatment of the solution obtained in the above second stage (b).

A stream of carbonic gas produced by an outer supply or more simply a stream of furnace fumes with large contents of carbon dioxide is caused to pass through the filtered solution so as to provide readily for a separation between the hydrated alumina which is treated after separation through conventional methods.

The solution obtained after this second filtration may be treated for the recovery of manganese, chromium and vanadium through suitable well known methods. In a simpler manner, the solution may be concentrated and dried through atomization or the like methods which leads to the obtention of an alkaline carbonate which is more or less colored by extraneous metals and which may be used however for a further sintering, so that an enrichment with extraneous metals is obtained at each operation.

The method forming the object of the present invention has never been applied hitherto for a treatment of raw materials of the type referred to and it may also be used for aluminium ores which have not undergone any treatment. In particular, this may be the case for bauxites the composition of which is somewhat similar to the compositions given hereinabove with merely higher contents of alumina (40 to 65%). This method may thus be competitive from an economical standpoint with reference to the conventional treating methods serving in the branches of industry treating aluminium.

A number of examples will now be described so as to allow a better understanding of the method forming the object of the invention.

*Example I.—Treatment of Red Sludge*

The red sludge used has the following composition:

27% $Al_2O_3$
31.24% $Fe_2O_3$ 41.76% (losses in roasting, $SiO_2$, $TiO_2$, CaO, $Na_2O$, $Cr_2O_3$)

100 kg. of said red sludge admixed intimately with 93 kg. of anhydrous carbonate of soda and 0.500 kg. of borax are raised to a temperature of 820° C. during 30 minutes.

The sintered product obtained which is very crumbly is crushed finely before it is washed with boiling water. It is then filtered so as to separate the filtrate from the residuum. Furnace fumes with large contents of carbon dioxide are caused to bubble through the filtrate and an abundant precipitate of hydrated alumina is obtained, which precipitate is collected and then roasted. This produces 25,700 kg. of alumina $Al_2O_3$ which is very white and the yield of alumina is equal to 95%.

Through concentration and atomization of the remaining liquid, an amount of 84 kg. of carbonate of soda is recovered (90% of the carbonate of soda used in the procedure are thus recovered).

The analysis of the residuum shows that the latter contains 54% of iron oxide ($Fe_2O_3$); this residuum may be considered as an iron ore similar to the lime-containing low grade iron ore from Lorraine and it may be treated in a similar manner through a reducing smelting operation in an electric furnace with a view to obtaining a high grade cast iron.

*Example II.—Treatment of a Residuum Obtained in the Production of Ferro-Titanium*

Said residuum has the following composition:

29.62% $Al_2O_3$
10.38% Fe (expressed as $Fe_2O_3$)
22.12% $TiO_2$
38% (losses during the roasting, $SiO_2$, MgO, MnO, CaO, oxides of vanadium and chromium)

100 kg. of said residual matter is admixed intimately with 102 kg. of anhydrous carbonate of soda and 0.300 kg. of borax and raised to a temperature of 820° C. during 30 minutes.

After operating in the manner described in Example I, there is obtained:

On the one hand 28.100 kg. of very white alumina ($Al_2O_3$).

The yield of alumina is equal to 94.9% of theory.

Since the residuary liquid which has an intense deep green color contains manganese, the latter is precipitated in the form of manganese oxide $MnO_2$. 3.700 kg. of $MnO_2$ are collected.

This being done, the alkaline colorless solution is concentrated and atomized so as to allow obtaining 92.500 kg. of anhydrous carbonate of soda which corresponds to the recovery of 90.6% of the carbonate of soda used for the treatment.

On the other hand a residuum containing:

19.2% of Fe (expressed as $Fe_2O_3$)
40.96% of $TiO_2$

This residuum may be considered as a titanium ore i.e. a concentrate of $TiO_2$, and it may be treated as such for the extraction of $TiO_2$.

*Example III.—Treatment of a Bauxite*

The composition of the bauxite was as follows:

61.5% $Al_2O_3$
2.5% $SiO_2$
2.8% $TiO_2$
13% $Fe_2O_3$
20.2% losses in roasting 100 kg. of bauxite are admixed intimately with 212 kg. of anhydrous carbonate of soda and 1 kg. of borax and the mixture is raised to a temperature of 820° C. during 30 minutes.

The operation similar to that described in the Example I leads to the obtention of:

On the one hand, 58.500 kg. of very white alumina $Al_2O_3$ so that the yield of extracted alumina is equal to about 95.1% in the present case.

After concentration and atomization of the remaining liquid, there is obtained 190.5 kg. of the anhydrous carbonate of soda which corresponds to a recovery of 89.8% of $CO_3Na_2$ used in the process.

On the other hand, a residuum containing 60% of $Fe_2O_3$.

As in the case of Example I, said residuum may be actually considered as a true iron ore similar to roasted pyrites and it may be treated in the same manner for the obtention of cast iron.

Of course, these advantages are given solely by way of an indication and by no means in a limiting sense. It is possible in fact, without widening the scope of the present invention as defined in the accompanying claims, to start from other raw materials having similar compositions and similarly it is possible to resort to various modifications in the execution of the method; in particular, the amount of reagents referred to may vary within very wide limits depending on the nature of the raw materials to be treated.

What we claim is:

1. A method of facilitating extraction of aluminum from mineral materials containing aluminum oxide together with compounds of iron, consisting of the steps of mixing said material with sodium carbonate, the weight of which is at least 90% that of said mineral material and with borax, the weight of borax being equal to 1 to 2% of the weight of aluminum oxide in the mineral material, and thence sintering the mixture at a temperature of from 800 to 850° C. for a period of from 10 to 30 minutes so that the aluminum compounds in the mixture are rendered water soluble, thence washing the sintered product with boiling water and thence filtering the material so that the aluminum compounds are in solution and the iron compounds are in the residuum.

2. A method of facilitating extraction of aluminum from red sludge containing iron compounds from the Bayor process, consisting of the steps of mixing said material with sodium carbonate and with borax, the weight of sodium carbonate being at least 90% of the weight of the red sludge and the weight of borax being equal to 1 to 2% of the weight of aluminum oxide in the red sludge, thence sintering the mixture at a temperature of from 800 to 850° C. for a period of from 10 to 30 minutes so that the aluminum compounds in the mixture are rendered water soluble, and thence washing the sintered product with boiling water and separating the soluble from the insoluble components so that the aluminum compounds are in the solution and the iron compounds are in the residuum.

3. A method of facilitating extraction of iron and aluminum from mineral material containing compounds of aluminum, iron, titanium, and compounds of a metal selected from the group consisting of vanadium, chromium and manganese, consisting of the steps of sintering said material at a temperature of from 800 to 850° C. for a period of from 10 to 30 minutes with a mixture of sodium carbonate and borax, the weight of sodium carbonate being at least equal to 90% of the weight of the mineral material and the weight of borax being at least equal to 1 to 2% of the weight of aluminum oxide in the mineral material, thence washing the sintered product with boiling water so that the iron and titanium compounds remain in an insoluble residuum and the aluminum, vanadium, chromium and manganese compounds go into solution, and thence separating the residuum from the solution.

4. A method of facilitating the extraction of iron and aluminum from materials containing aluminum oxide, iron and titanium oxides, consisting of the steps of sintering said material at a temperature of from 800 to 850° C.

for a period of from 10 to 30 minutes with a mixture of sodium carbonate and borax, the weight of sodium carbonate being at least equal to 90% of the raw material and the weight of borax being about 1 to 2% of the weight of aluminum oxide in the raw material, thence washing the sintered product with boiling water so that the iron and titanium compounds remain in the insoluble residuum and the aluminum compounds go into solution, and thence separating the residuum from the solution.

5. A method of facilitating the extraction of metal compounds from material containing aluminum, iron and titanium oxides, and a heavy metal compound selected from the group consisting of vanadium, chromium and manganese compounds, consisting of the steps of sintering said material at a temperature of from 800 to 850° C. for a period of from 10 to 30 minutes with a mixture of sodium carbonate and borax, the weight of sodium carbonate being at least equal to 90% of the weight of the raw material and the weight of borax being about 1 to 2% of the weight of the aluminum oxide in the raw material, thence washing the sintered product with boiling water so that the iron and titanium compounds remain in the insoluble residuum and the aluminum and heavy metal compounds go into solution, thence separating the residuum from the solution, thence precipitating the aluminum from the solution by the addition of carbon dioxide thereto, thence separating the precipitate from the solution remaining, and thence precipitating the heavy metal from the solution.

References Cited in the file of this patent

UNITED STATES PATENTS

| | | |
|---|---|---|
| 1,334,004 | Van Der Toorn | Mar. 16, 1920 |
| 2,375,343 | Brown | May 8, 1945 |
| 2,469,088 | Thompson | May 3, 1949 |
| 2,637,628 | De Vecchis et al. | May 5, 1953 |
| 2,721,793 | Margri et al. | Oct. 25, 1955 |

FOREIGN PATENTS

| | | |
|---|---|---|
| 17,246 of 1908 | Great Britain | July 15, 1909 |
| 9,210 of 1906 | Great Britain | Apr. 18, 1907 |